(12) United States Patent
Gagne et al.

(10) Patent No.: US 8,656,951 B2
(45) Date of Patent: *Feb. 25, 2014

(54) ENCAPSULATED VALVE SYSTEM (75) Inventors: Michael C. Gagne, Mission Viejo, CA (US); Steven V. Cates, Corona, CA (US)

(73) Assignee: Alphabio, Inc., Rancho Santa Margarita, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,983

(22) Filed: Jul. 20, 2012

(65) Prior Publication Data
US 2012/0279594 A1    Nov. 8, 2012

Related U.S. Application Data (63) Continuation of application No. 12/466,918, filed on May 15, 2009, now Pat. No. 8,235,067.

(51) Int. Cl.
*E03B 1/00* (2006.01)

(52) U.S. Cl.
USPC ...... 137/606; 137/594; 137/884; 137/315.07; 251/7

(58) Field of Classification Search
USPC ............... 137/594, 884, 315.7, 315.07, 606; 251/7
See application file for complete search history.

(56) References Cited

U.S. PATENT DOCUMENTS

| | | | | |
|---|---|---|---|---|
| 4,254,797 A * | 3/1981 | Mayeaux | | 137/565.13 |
| 5,197,708 A * | 3/1993 | Campau | | 251/8 |
| 5,549,134 A * | 8/1996 | Browne et al. | | 137/606 |
| 6,036,166 A * | 3/2000 | Olson | | 251/7 |
| 6,068,751 A | 5/2000 | Neukermans | | |
| 6,543,483 B2 * | 4/2003 | Johnson | | 137/884 |
| 6,554,589 B2 * | 4/2003 | Grapes | | 417/477.12 |
| 6,631,736 B2 * | 10/2003 | Seitz et al. | | 137/883 |
| 6,644,353 B1 * | 11/2003 | Eidsmore | | 137/884 |
| 7,367,363 B2 | 5/2008 | Friedline et al. | | |
| 2007/0295867 A1 | 12/2007 | Hennon | | |
| 2008/0035227 A1 * | 2/2008 | Woods et al. | | 138/108 |
| 2009/0120503 A1 | 5/2009 | Donahue | | |

OTHER PUBLICATIONS

BioWorks LLC Product Brochure (date: unknown), BSC: Bio Sample Cup, Safe, Sanitary Material Storage, Easton, PA 18042, www.BioWorksLLC.com (6 pages).

(Continued)

*Primary Examiner* — Jason J Boeckmann
*Assistant Examiner* — Joel Zhou
(74) *Attorney, Agent, or Firm* — Vista IP Law Group LLP (57) ABSTRACT

An encapsulated valve system includes a first housing portion having a first facing surface, the first facing surface comprising a plurality of branch pathways formed as a recess within the first facing surface. The valve system further includes a second housing portion having a second facing surface, the second facing surface comprising a plurality of branch pathways formed as a recess within the second facing surface. A disposable conduit is configured to be interposed between the first and second housing portions and disposed within the recess of the first facing surface and the recess of the second facing surface. The disposable conduit is thus sandwiched between the first and second facing surfaces. A plurality of pinch valve actuators are mounted on one or both of the first housing portion and the second housing portion, the plurality of pinch valve actuators configured to pinch the disposable conduit at selective branch pathways.

13 Claims, 11 Drawing Sheets

(56) References Cited

OTHER PUBLICATIONS

Parker Mitos Product Brochure, Mitos Free Flow Valve, Apr. 29, 2009, http://www.mitostech.com/freelow.html (2 pages).
PCT International Search Report for PCT/US10/34371, Applicant: AlphaBio, Inc., Form PCT/ISA/210 and 220, dated Jul. 1, 2010 (4 pages).
PCT Written Opinion of the International Search Authority for PCT/US10/34371, Applicant: AlphaBio, Inc., Form PCT/ISA/237, dated Jul. 1, 2010 (7 pages).
PCT International Preliminary Report on Patentability (Chapter I of the Patent Cooperation Treaty) for PCT/US2010/034371, Applicant: AlphaBio, Inc., Form PCT/IB/326 and 373, dated Nov. 15, 2011 (9 pages).

* cited by examiner

ENCAPSULATED VALVE SYSTEM

RELATED APPLICATION

This application is a continuation of U.S. patent application Ser. No. 12/466,918, filed on May 15, 2009, now issued as U.S. Pat. No. 8,235,067, the entire disclosure of which is expressly incorporated by reference herein.

FIELD OF THE INVENTION

The field of the invention generally relates to fluid management devices and, in particular, valve systems. More specifically, the invention pertains to valve systems used by pharmaceutical and biological applications or other hygienic process industries.

BACKGROUND OF THE INVENTION

Many commercial products are produced using chemical as well as biological processes. Pharmaceuticals, for example, are produced in commercial quantities using scaled-up reactors and other equipment. So-called biologics are drugs or other compounds that are produced or isolated from living entities such as cells or tissue. Biologics can be composed of proteins, nucleic acids, or complex combinations of these substances. They may even include living entities such as cells. In order to produce biologics on a commercial scale, sophisticated and expensive equipment is needed. In both pharmaceutical and biologics, for example, various processes need to occur before the final product is obtained. For example, in the case of biologics, cells may be grown in a growth chamber or the like and nutrients may need to be carefully modulated into the growth chamber. Waste products produced by cells may also have to be removed on a controlled basis from the fermentation chamber. As another example, biologic products produced by living cells or other organisms may need to be extracted and concentrated. This process may involve a variety of filtration and separation techniques.

Because there are a number of individual processes required to be produce the final product, various reactants, solutions, and washes are often pumped or otherwise transported to various subsystems using conduits and associated valves. These systems may be quite cumbersome and organizationally complex due to the large numbers of conduits, valves, sensors, and the like that may be needed in such systems. Not only are these systems visually complex (e.g., resembling spaghetti) they also include many components that are required to sterilized between uses to avoid cross-contamination issues. Indeed, the case of drug and biologic preparation, the Federal Food and Drug Administration (FDA) is becoming increasingly strict on sterilization procedures that are required for drug and pharmaceutical preparations. This is particularly of a concern because many of these products are produced in batches which would require repeated sterilization of a variety of components.

Some attempts have been made at incorporating various disposable elements into the system. For example, conduits or lines connecting various systems or elements have been made of silicone. Unfortunately, silicone tubing or conduits often have to be reinforced along their periphery to avoid the possibility of leakage through an aneurysm or the like that develops at the wall of the tubing. Reinforced silicone tubing is, however, rather expensive and is not as flexible as un-reinforced silicone. Systems that are disposable or incorporate disposable elements are advantageous because they avoid the need for cleaning-in-place (CIP) cleaning, sanitization, or re-sterilization. Another problem with existing fluid management and valving systems is that they contain a significant residual volume. Namely, the volume contained within all the conduits and other constituents of the process may be quite large. It is desirable to reduce the residual volume within the system in order to decrease the overall size of the system. Perhaps more importantly, however, there can be a significant dollar loss in residual product that is contained within a system. For instance, some biologics need to be produced in very small amounts—even for commercial applications. Thus, the actual cost of the drug per unit mass (or volume) is extremely high. Even a small amount of product that is lost in this residual volume may translate into a significant amount of money.

There thus is a need for an improved valve system that leverages the benefits of disposable components. The valve system should reduce the organizational complexity of existing systems. In addition, in most applications, it would be beneficial if the valve system could reduce the amount of residual volume within the system.

SUMMARY OF THE INVENTION

According to one aspect of the invention, an encapsulated valve system includes a first housing portion having a first facing surface, the first facing surface comprising a plurality of branch pathways formed as a recess within the first facing surface. The valve system further includes a second housing portion having a second facing surface, the second facing surface comprising a plurality of branch pathways formed as a recess within the second facing surface. A disposable conduit is configured to be interposed between the first and second housing portions and disposed within the recess of the first facing surface and the recess of the second facing surface. The disposable conduit is thus sandwiched between the first and second facing surfaces. A plurality of pinch valve actuators are mounted on one or both of the first housing portion and the second housing portion, the plurality of pinch valve actuators configured to pinch the disposable conduit at selective branch pathways.

In another aspect of the invention, an encapsulated valve system includes a first housing portion having a first facing surface, the first facing surface comprising a plurality of branch pathways formed as a recess within the first facing surface. The encapsulated valve system includes a second housing portion having a second facing surface, the second facing surface comprising a plurality of branch pathways formed as a recess within the second facing surface. A disposable conduit is configured to be interposed between the first and second housing portions and disposed within the recess of the first facing surface and the recess of the second facing surface. A plurality of pinch valve actuators are mounted to the first housing portion and the second housing portion along a seam formed between the first facing surface and the second facing surface, the plurality of pinch valve actuators configured to pinch the disposable conduit at selective branch pathways.

According to one aspect of the invention, the first and second housing portions may be formed from a metal such as, for instance, stainless steel. The first and second housing portions may be made of other materials, however. For instance, a polymer material such as a plastic may be used encapsulate the disposable conduit.

The encapsulated valve system may include any number of branch pathways. For example, the valve system may include a single inlet that then branches into a plurality of outlets.

Alternatively, there may be a plurality of inlets that branch into a plurality of outlets. In yet another configuration, there may be a plurality of inlets and a single outlet. In one aspect, the plurality of branch pathways includes a first pathway that extends across the first and second facing surfaces and a second, separate pathway that extends across the first and second facing surfaces. A third pathway bridges the first and second pathways. In this configuration, the various pathways may have an H-shape.

According to another aspect of the invention, the flange fittings are disposed at each location where the plurality of branch pathways exit or enter the first and second housing portions. The flange fittings may comprise first and second halves that are located on respective first and second housing portions. When the first and second housing portions are placed in a facing arrangement, the complete flange fittings are formed. The flange fittings are configured so that other devices and components may be secured to the fittings. For example, additional conduits, valves, and the like may be coupled to the flange fittings.

In another aspect of the invention, the disposable conduit may optionally include seals or gaskets that are located at terminal ends. The seals or gaskets are dimensioned to fit within respective flange fittings located on the encapsulated valve system. The seals/gaskets may be molded or otherwise integrally formed with the disposable conduit. These may be formed as the same material used in the underlying disposable conduit (e.g., silicone or plastic).

In another aspect of the invention, the plurality pinch valve actuators may include manually-controlled actuators. In another aspect, however, the plurality of pinch valve actuators may include automatically-controlled actuators. These include, by way of example, pneumatic, electrical, solenoid-based, stepper-based, or servo-based actuators. Of course, in a single encapsulated valve system, there may be one or more manually-controlled actuators in combination with one or more automatically-controlled actuators.

Fasteners may be used to secure the first housing portion to the second housing portion. The fasteners may be removed to permit the first and second housing portions to be opened up so that the internal disposable conduit may be disposed of. The fasteners may include screws, clamps, bolts or the like. It may even be possible to use an adhesive bond between the first and second housing portions.

DETAILED DESCRIPTION OF THE ILLUSTRATED EMBODIMENTS

Figure 1:
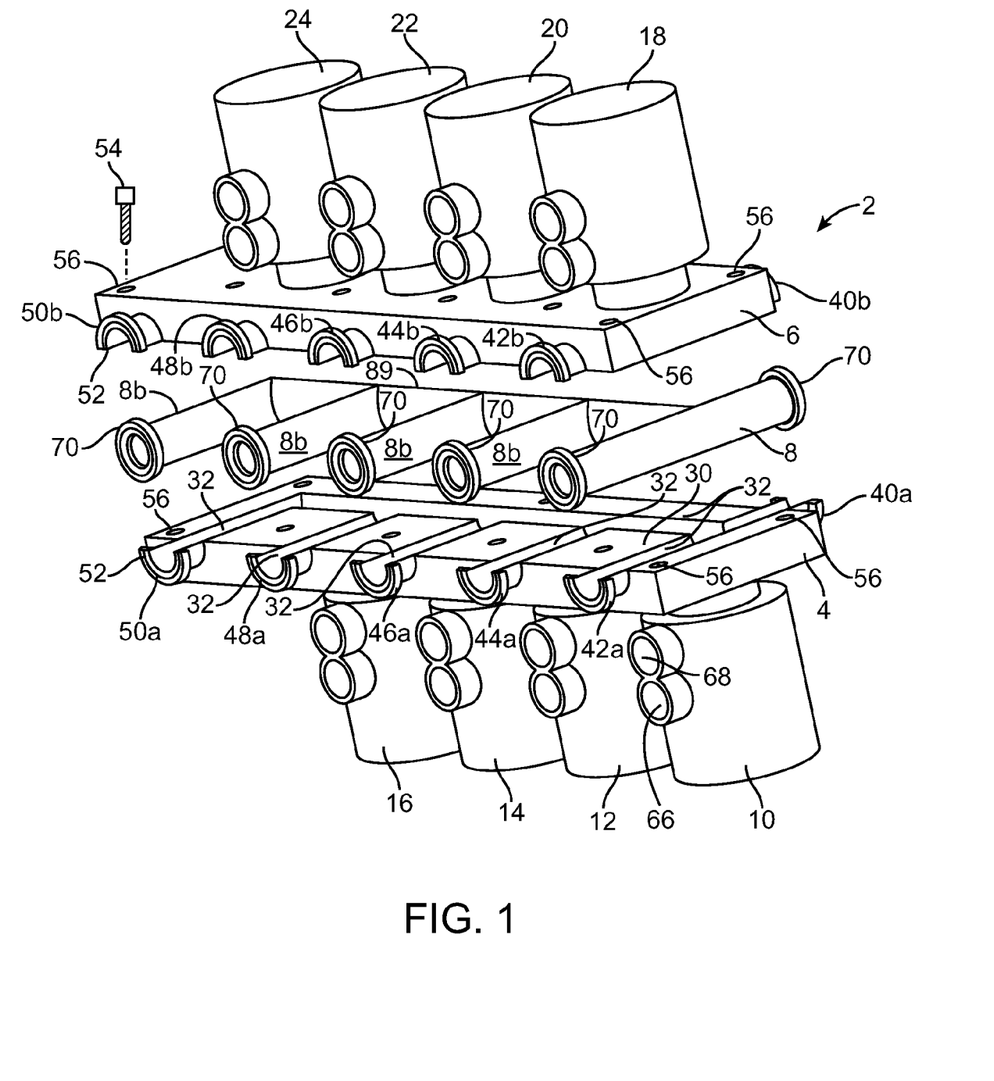
FIG. 1 illustrates an exploded, perspective view of an encapsulated valve system.
Figure 2:
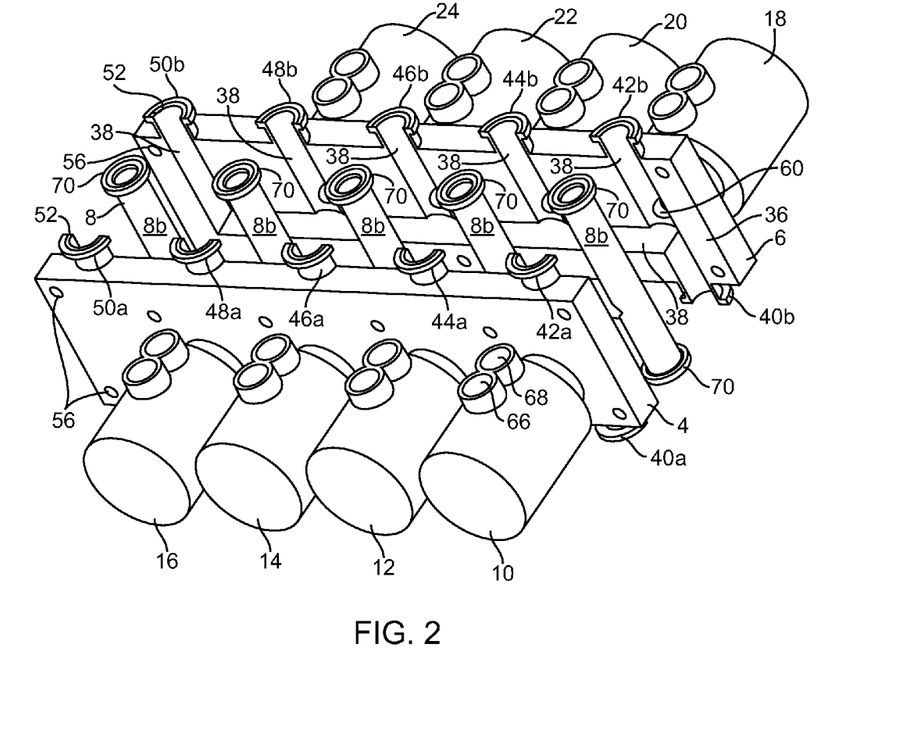
FIG. 2 illustrates another exploded, perspective view of an encapsulated valve system.
Figure 3:
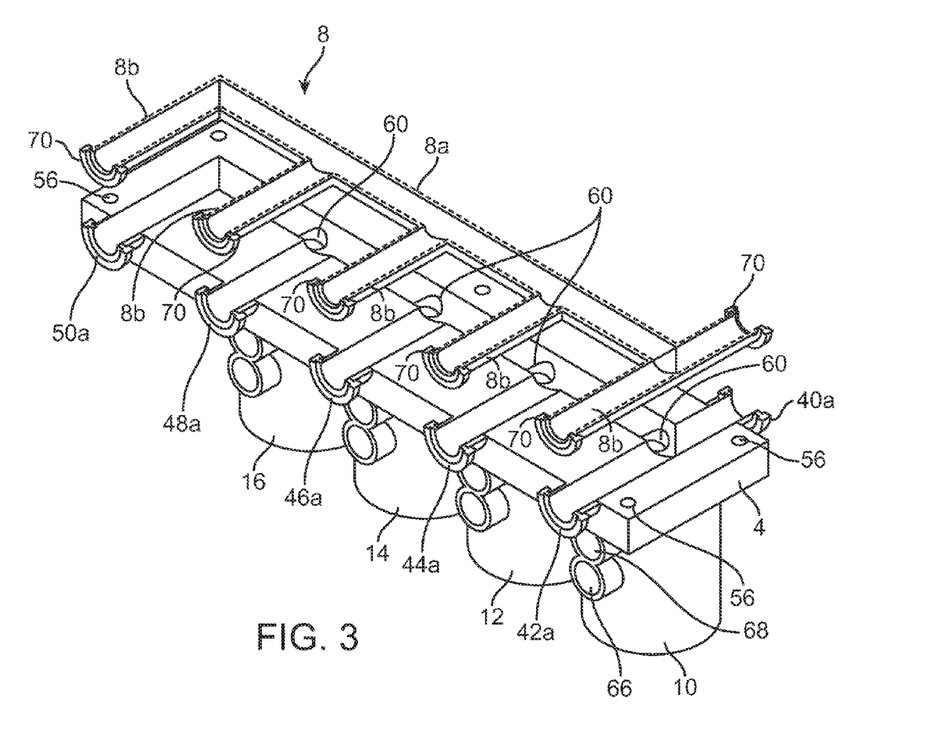
FIG. 3 illustrates a perspective view of the first housing portion of the encapsulated valve system along with a cross-sectional, perspective view of the disposable conduit.

FIGS. 1-3 illustrate an encapsulated valve system 2 according to one embodiment. The encapsulated valve system 2 includes a first housing portion 4, a second housing portion 6, and a disposable conduit 8 that, in an assembled state, is interposed between the first housing portion 4 and the second housing portion 6. The encapsulated valve system 2 further includes a plurality of pinch valve actuators 10, 12, 14, 16, 18, 20, 22, 24. As seen in FIG. 1, pinch valve actuators 10, 12, 14, and 16 are mounted on the first housing portion 4 while pinch valve actuators 18, 20, 22, and 24 are mounted on the second housing portion 6. While eight (8) pinch valve actuators are illustrated in FIGS. 1-2 (four (4) are illustrated in FIG. 3) more or less may be included depending on the particular configuration of the encapsulated valve system 2.

Still referring to FIGS. 1 and 2, the first housing portion 4 has a first facing surface 30 that includes a plurality of branch passageways 32 formed as a recess within the first facing surface 30 of the first housing portion 4. In particular, the recesses that form the plurality of branch passageways 32 may be milled, worked, or molded into the first facing surface 30. The first housing portion 4 and the second housing portion 6 may be formed from a metallic material such as, for instance, stainless steel. Alternatively, the first housing portion 4 and the second housing portion 6 may be formed from a polymer material such as plastic or the like. In a similar manner, as best seen in FIG. 2, the second housing portion 6 has a second facing surface 36 and includes a plurality of branch passageways 38 formed as a recess within the second facing surface 36 of the second housing portion 6. The recesses formed in the second facing surface 36 may be formed is the same manner with respect to those recesses within the first facing surface 30. In particular, the branch passageways 32, 38 are formed the first and second facing surfaces 30, 36, respectively, in a mirrored fashion such that the corresponding recesses match to form a substantially concentric passageway (combined recesses 32, 28) when the first facing surface 30 is brought into contact (or close proximity) with the second facing surface 36.

Referring now to FIGS. 1-3, the plurality of branch passageways 32, 38 terminate at respective flange fittings 40a, 40b, 42a, 42b, 44a, 44b, 46a, 46b, 48a, 48b, 50a, 50b. Each flange fitting represents one-half of the complete flange fitting. Thus, when the first facing surface 30 and second facing surface 36 are brought together or in close proximity the complete flange fitting is formed. The complete flange fitting (e.g., 40a and 40b) appear circular in shape although other geometries may be utilized. The flange fittings 40a, 40b, 42a, 42b, 44a, 44b, 46a, 46b, 48a, 48b, 50a, 50b may be formed to conform to uniform standards within the relevant industry or application. For example, there are universal shapes and sizes that are typically employed in various applications. While it is contemplated that the flange fittings 40a, 40b, 42a, 42b, 44a, 44b, 46a, 46b, 48a, 48b, 50a, 50b may be designed to conform to these standards or commercial conventions other sizes are also contemplated to fall within the scope of the invention. Each flange fitting 40a, 40b, 42a, 42b, 44a, 44b, 46a, 46b, 48a, 48b, 50a, 50b optionally includes a recess 52 that is dimensioned to receive seal or gasket (explained more below). In this regard, a seal or gasket can be placed into the recess 52 so that a good fluidic seal can be formed between other devices and apparatus and the various complete flange fittings.

Figure 8:
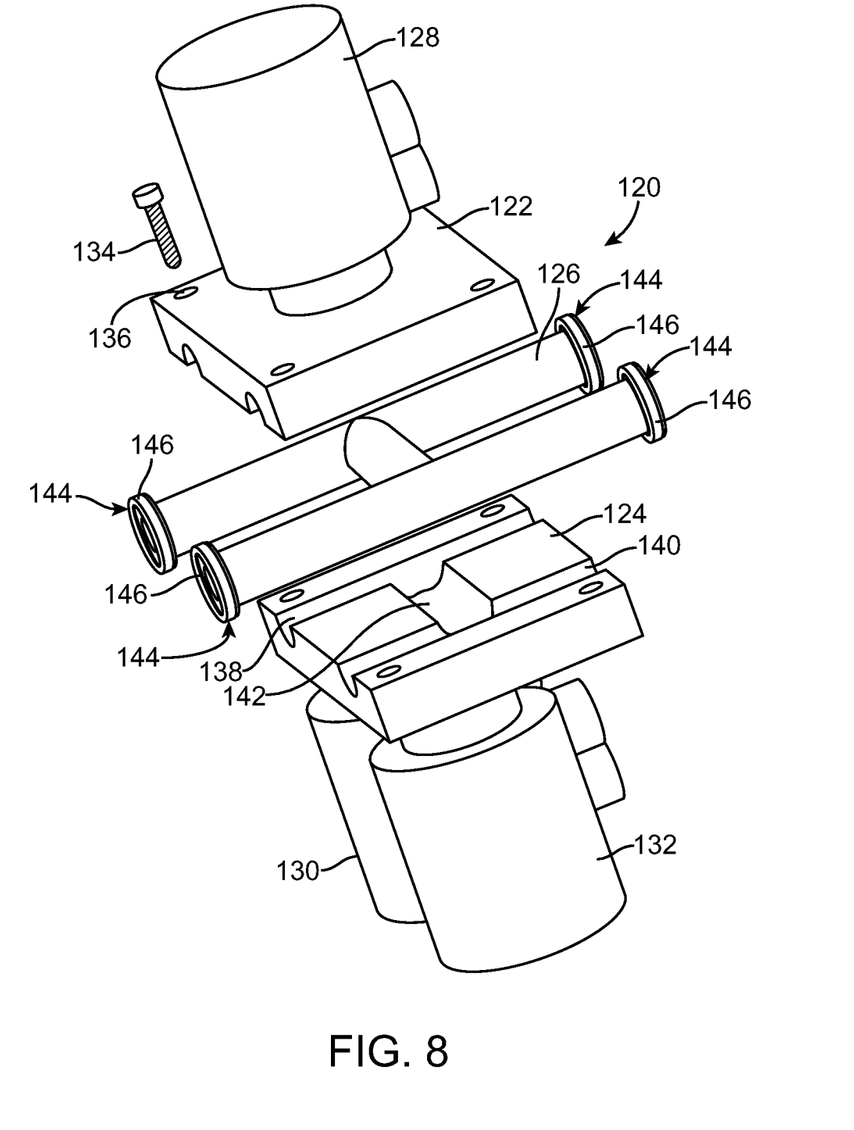
FIG. 8 illustrates an exploded, perspective view of an encapsulated valve system according to another embodiment.

As an alternative to the flange fittings 40a, 40b, 42a, 42b, 44a, 44b, 46a, 46b, 48a, 48b, 50a, 50b described above, the branch passageways 32, 38 may terminate in plain tube endings or other types of connectors known to those skilled in the art. The connectors may be integrally formed into the first and second housing portions 4, 6 or they may be secured after formation of the first and second housing portions 4, 6. For example, the endings or connectors may be welded, bonded, or otherwise affixed to the first and second housing portions 4, 6. The endings or connectors may be configured to adapt to other mechanical or heat-weldable union types known to those skilled in the art. Optionally, the first and second housing portions 4, 6 may not have any flange fittings, for example, as illustrated in FIG. 8.

Still referring to FIGS. 1-3, the first housing portion 4 and the second housing portion 6 may be secured to one another via a fastener 54. In the embodiment illustrated in FIGS. 1-3, the fastener 54 is a screw or bolt that passes through apertures 56 that are located in the first housing portion 4 and the second housing portion 6. The fastener 54 may include other devices such as clamps, bolts or the like. It may even be possible to use a water-soluble adhesive bond between the first housing portion 4 and the second housing portion 6. In one aspect of the invention, the fasteners 54 are configured to be removable such that the first housing portion 4 can be separated from the second housing portion 6 to remove the inner disposable conduit 8.

Referring now to FIG. 3, along pre-selected portions of the branch passageways 32 there are provided apertures 60 that are dimensioned to receive a pinching element 62 (seen in FIG. 4) from respective pinch valve actuators 10, 12, 14, 16. Similar apertures 60 are located in the branch passageways 38 of the second housing portion 6. Once such aperture 60 is seen in FIG. 2. The locations of the various apertures 60 are chosen to provide the ability to valve or gate a fluid medium into one or more selected branch passageways 32, 38. In one aspect, the locations of the apertures in the first housing portion 4 may be different from those in the second housing portion 6. In this regard, the disposable conduit 8 is pinched only on one side within the respective passageway 32, 38. In this configuration, the various actuators 10, 12, 14, 16, 18, 20, 22, and 24 operate in a so-called block and bleed arrangement. Certain actuators such as, for instance, pinch valve actuators 10, 12, 14, and 16 may act as blocking actuators that block selected areas of the common line 8a of the disposable conduit 8 as seen in FIG. 3. Still other actuators such as, for instance, pinch valve actuators 18, 20, 22, 24 may act as bleed actuators that pinch branch lines 8b as seen in FIG. 3. Alternatively, the apertures 60 in the first housing portion 4 are aligned with the location of the apertures in the second housing portion 6. In this regard, the disposable conduit 8 may be pinched by respective pinching elements 62 of opposing pinch valve actuators (e.g., pinch valve actuators 10 and 18).

Figure 4:
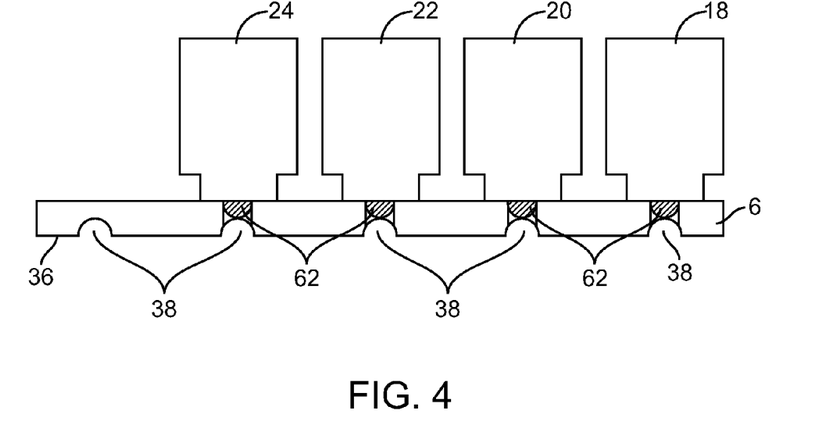
FIG. 4 illustrates a side cross-sectional view of the second housing portion of the encapsulated valve system illustrating the pinch valve actuators.

FIG. 4 illustrates a cross-sectional view of the pinch valve actuators 18, 20, 22, and 24 mounted on the second housing portion 6. Each pinch valve actuator 18, 20, 22, 24 includes a pinching element 62 that, when actuated, moves downward within the branch passageway 38 to pinch the disposable conduit 8 (not shown in FIG. 4 for clarity). In the embodiment illustrated in FIGS. 1-4, the pinch valve actuators 10, 12, 14, 16, 18, 20, 22, 24 are automatically-controlled actuators. In particular, the pinch valve actuators 10, 12, 14, 16, 18, 20, 22, 24 are pneumatically controlled pinch valve actuators. For example, compressed or pressurized (or even vacuum pressure) air is used to control the actuators in an on/off state. For example, the "off" state may include when the respective pinching element 62 is retracted while the "on" state may include when the respective pinching element 62 is extended into the branch passageway 32, 38. The pinch valve actuators 10, 12, 14, 16, 18, 20, 22, 24 may each include an inlet 66 and an outlet 68 (illustrated on pinch valve actuator 10). The pinch valve actuators 10, 12, 14, 16, 18, 20, 22, 24 may include air-to-spring or air-to-air actuators.

While pneumatically-operated pinch valve actuators 10, 12, 14, 16, 18, 20, 22, 24 are illustrated in FIGS. 1-4, the pinch valve actuators may be electrical in nature. These include, by way of example, various types of actuators including solenoid coil-based actuators, stepper motor-based actuators, or servo-motor-based actuators. In yet another alternative, the pinch valve actuators 10, 12, 14, 16, 18, 20, 22, 24 may even be manually-controlled though the use of a knob, lever, or the like. In addition, some pinch valve actuators may be automatically controlled while others may be manually controlled.

Turning now to FIGS. 1-3, the disposable conduit 8 may include a seal or gasket 70 located at terminal ends thereof. Six (6) such seals 70 are illustrated in FIGS. 1-3. The seals 70 are dimensioned to fit within the recess 52 of each flange fitting 40a, 40b, 42a, 42b, 44a, 44b, 46a, 46b, 48a, 48b, 50a, 50b. In this regard, a seal 70 can be placed into the recess 52 so that a good fluidic seal can be formed between other devices and apparatus and the various complete flange fittings. Of course, as stated herein, in certain embodiments, there is other types of connectors or ends can be employed other than the specifically illustrated flange fittings 40a, 40b, 42a, 42b, 44a, 44b, 46a, 46b, 48a, 48b, 50a, 50b. These include plain tubes or ends configured for adapting to other types of connectors such as, for instance, the BioQuate Disposable Aseptic Connector (DAC) available from BioQuate, Inc., Clearwater, Fla., or the KLEENPAK sterile connector (Pall Life Sciences Products, East Hills, N.Y.).

The disposable conduit 8 may be made of un-reinforced silicone tubing. In this manner, there is no need to use expensive and inflexible reinforced tubing. The first housing portion 4 and the second housing portion 6 serve to encapsulate the disposable conduit 8 in a sort of exoskeleton that prevents the formation of aneurysms within the disposable conduit 8. The encapsulated structure also enables very high pressure ratings for the encapsulated valve system 10. While un-reinforced silicone tubing may be used for the disposable conduit 8, other materials suitable for this purpose include by way of example C-FLEX tubing (Saint-Gobain, France) or tubing made of STA-PURE (W.L. Gore & Associates, Newark, Del.) or other types of thermoplastic elastomers (TPE), elastomeric, or silicone tubing, or other materials known to those skilled in the art. Generally, the un-reinforced tubing is made from a polymeric material.

Figure 5:
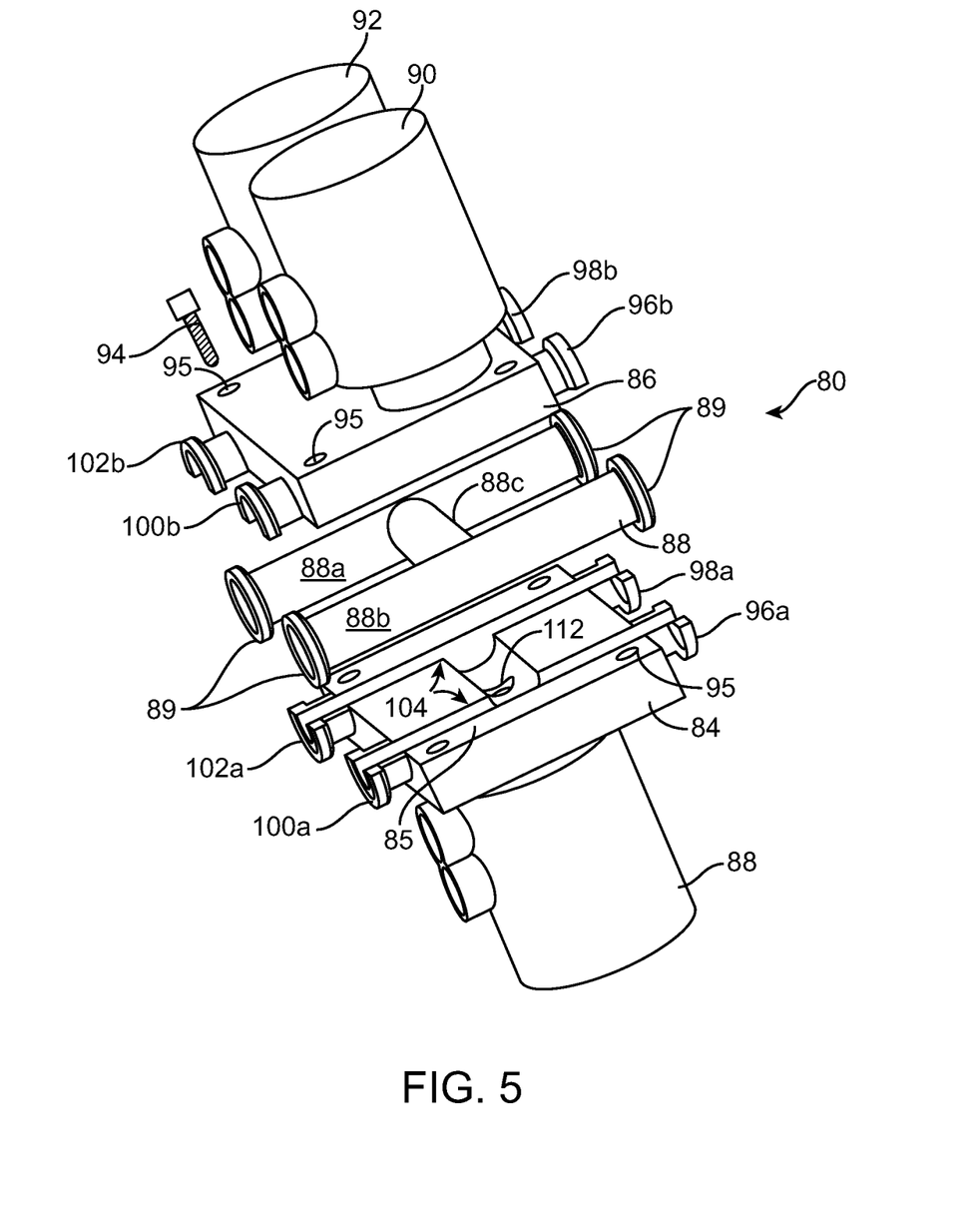
FIG. 5 illustrates an exploded, perspective view of an encapsulated valve system according to another embodiment.
Figure 6:
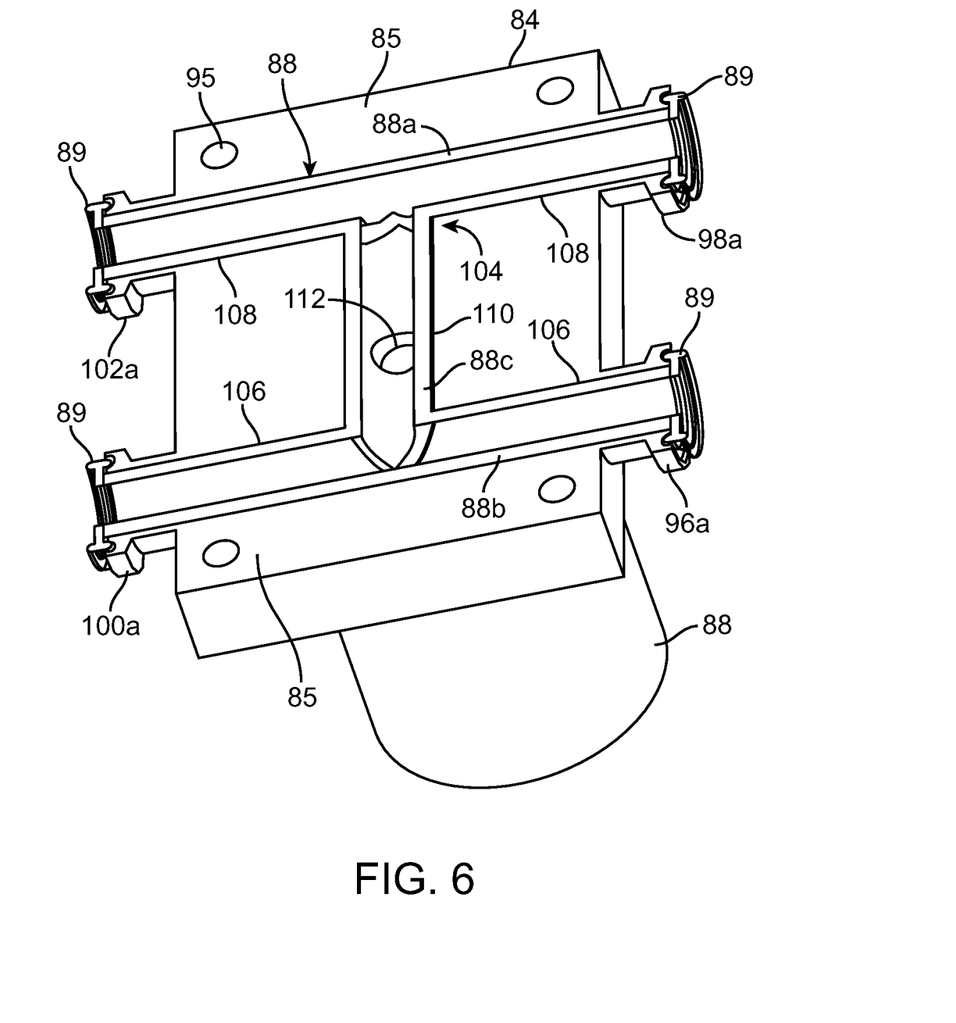
FIG. 6 illustrates a perspective view of the first housing portion of the encapsulated valve system of FIG. 5 along with a cross-sectional, perspective view of the disposable conduit.
Figure 7:
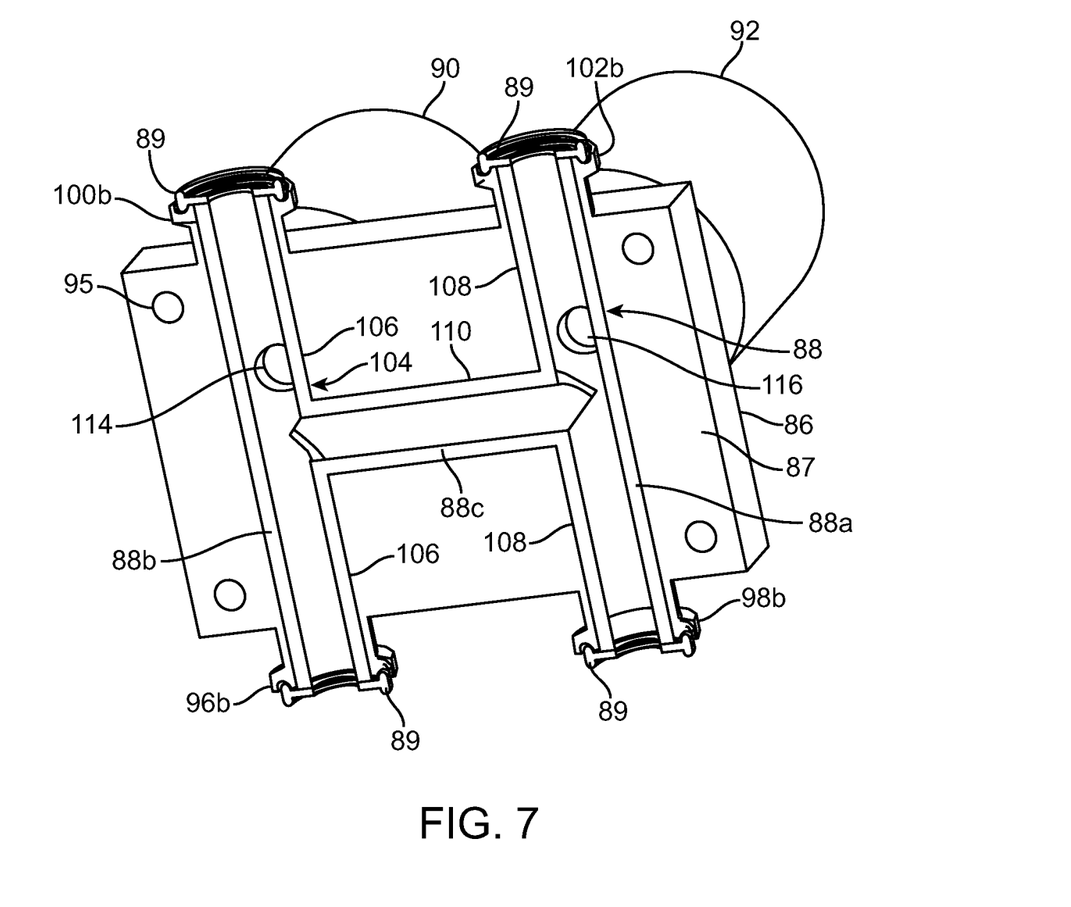
FIG. 7 illustrates a perspective view of the second housing portion of the encapsulated valve system of FIG. 5 along with a cross-sectional, perspective view of the disposable conduit.

FIGS. 5-7 illustrate an alternative embodiment of an encapsulated valve system 80. In this embodiment, the encapsulated valve system 80 includes a first housing portion 84, a second housing portion 86, and a disposable conduit 88 that, in an assembled state, is interposed between the first housing portion 84 and the second housing portion 86. The encapsulated valve system 80 further includes a plurality of pinch valve actuators 88, 90, 92. As seen in FIG. 5, pinch valve actuator 88 is mounted on the first housing portion 84 while pinch valve actuators 90, 92 are mounted on the second housing portion 86.

The first housing portion 84 and the second housing portion 86 may be secured to one another using a fastener 94 that passes through aperture 95. Of course other fasteners of the type described herein may also be used. The disposable conduit 88 may be formed from the same materials described above with respect to the embodiment of FIGS. 1-4. The disposable conduit 88 may include a seal or gasket 89 located at terminal ends thereof. The seal or gasket 89 may be integrally formed with the conduit 88 or, alternatively, as a separate structure. Thus, the disposable conduit 88 may itself terminate in a seal or gasket 89. In addition, the first housing portion 84 and the second housing portion 86 include flange fittings 96a, 96b, 98a, 98b, 100a, 100b, and 102a, 102b that combine together (as halves) to form complete fittings as described above. The pinch valve actuators 88, 90, 92 are illustrated as being pneumatically operated as described above. Of course, various other types of pinch valve actuators may be employed.

FIG. 6 illustrates a cross-sectional view taken through the disposable conduit 88 that lies within the branch passageways 104. The first facing surface 85 of the first housing portion 84 is illustrated. FIG. 7 illustrates the corresponding second facing surface 87 of the second housing portion 86 that is brought into contact with (or near) the first facing surface 85 when the disposable conduit 88 is interposed between two housing portions 84, 86. In this embodiment, a first pathway 106 extends across the first facing surface 85 of the first housing portion 84 and the second surface 87 of the second housing portion 86 (FIG. 7). A second pathway 108 extends across the first facing surface 85 of the first housing portion 84 and the second surface 87 of the second housing portion 86 (FIG. 7). A third pathway 110 is formed in both the first facing surface 85 and the second facing surface 87 and bridges the first pathway 106 to the second pathway 108. As seen in FIG. 6, the third pathway 110 includes an aperture 112 that is dimensioned to receive a pinching element from pinch valve actuator 88 which is the same as previously described herein.

FIG. 7 illustrates the underside of the second housing portion 86. As seen herein, two apertures 114, 116 are formed in the first pathway 106 and the second pathway 108. These apertures 114, 116 are dimensioned to receive pinching elements from respective pinch valve actuators 90, 92 which are the same as previously described herein. In this configuration, the branch pathways 106, 108, 110 form an H-shape. The disposable conduit 88 is shaped in the form of an H as well with two side portions 88a, 88b and a bridging portion 88c. In this configuration, the pinch valve actuator 88, when actuated, blocks flow between the first and second pathways 106, 108. The remaining pinch valve actuators 90, 92 prevent fluid from passing into or exiting from pathways 106, 108. Again, this embodiment of the encapsulated valve system 80 may operate in a so-called block and bleed arrangement.

FIG. 8 illustrates an alternative embodiment of an encapsulated valve system 120. In this embodiment, the encapsulated valve system 120 includes a first housing portion 122, a second housing portion 124, and a disposable conduit 126 that, in an assembled state, is interposed between the first housing portion 122 and the second housing portion 124. The encapsulated valve system 120 further includes a plurality of pinch valve actuators 128, 130, 132. As seen in FIG. 8, a pinch valve actuator 128 is mounted on the first housing portion 122 while pinch valve actuators 130, 132 are mounted on the second housing portion 124. The various pinch valve actuators 128, 130, 132 operate in a similar manner as described herein. Still referring to FIG. 8, a plurality of branch pathways includes first pathway 138, second pathway 140, and bridging pathway 142.

The first housing portion 122 and the second housing portion 124 may be secured to one another using a fastener 134 that passes through aperture 136. Of course other fasteners of the type described herein may also be used. The disposable conduit 126 may be formed from the same materials described above with respect to the embodiment of FIGS. 1-7. In this embodiment, the first housing portion 122 and the second housing portion 124 do not include any flange fittings. Rather, the first and second pathways 138 and 140 terminate simply at an opening (or exit as the case may be) in the respective halves of the first housing portion 122 and the second housing portion 124. In the embodiment of FIG. 8, the terminal ends 144 of the disposable conduit may optionally be constructed to include fittings 146 that are designed to interface or connect with other components. The particular fitting 146 may include a sealing member, gasket, or the like that can then be used to create a fluidic seal with another device or component. Of course, the particular fitting 146 may vary according to the particular application in which the encapsulated valve system 120 is used.

Figure 9:
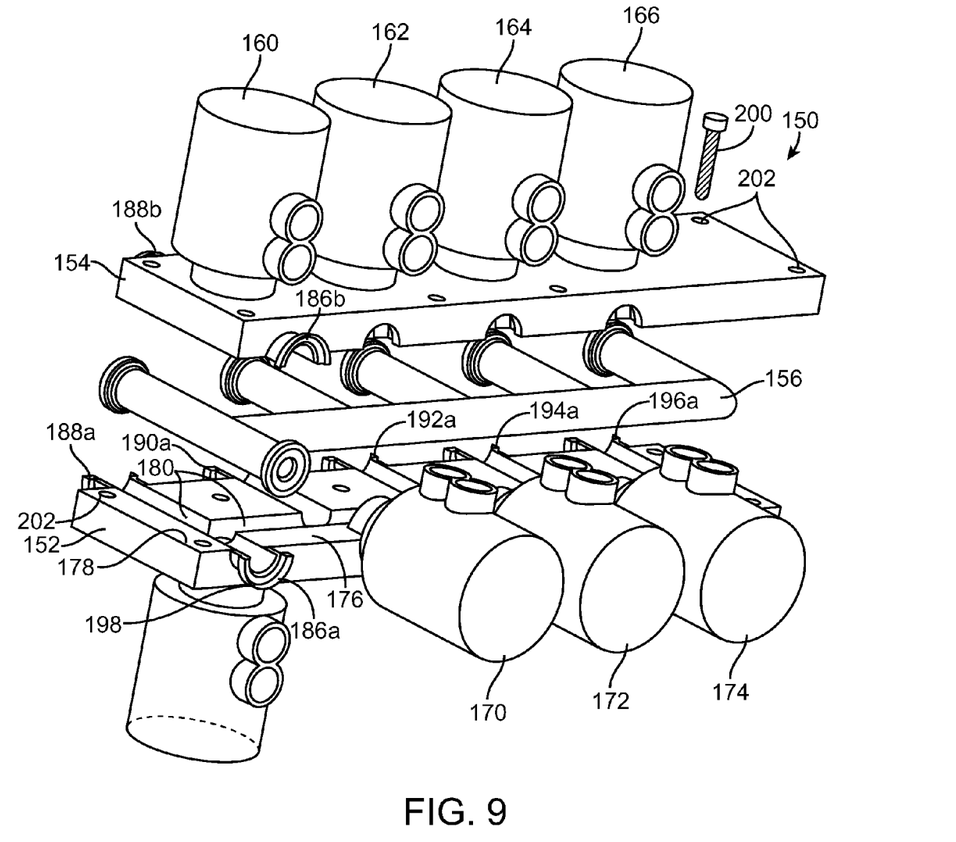
FIG. 9 illustrates an exploded, perspective view of an encapsulated valve system according to another embodiment.
Figure 10:
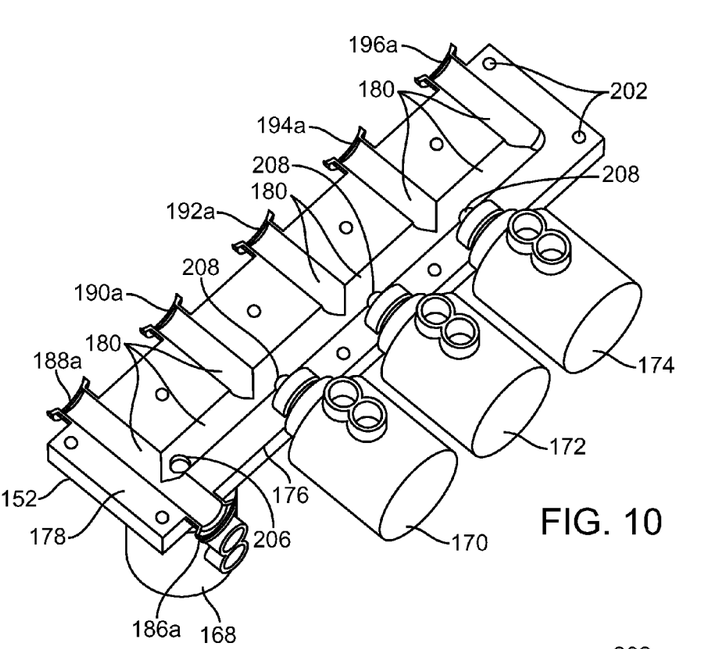
FIG. 10 illustrates a perspective view of the underside of a first housing portion of the encapsulated valve system of FIG. 9.
Figure 11:
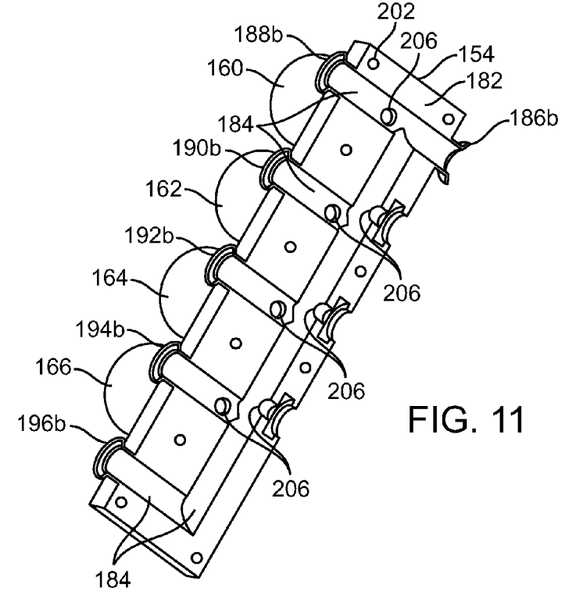
FIG. 11 illustrates a perspective view of the underside of a second housing portion of the encapsulated valve system of FIG. 9.

FIGS. 9-11 illustrate an encapsulated valve system 150 according to another embodiment. The encapsulated valve system 150 includes a first housing portion 152, a second housing portion 154, and a disposable conduit 156 that, in an assembled state, is interposed between the first housing portion 152 and the second housing portion 154. The encapsulated valve system 150 further includes a plurality of pinch valve actuators 160, 162, 164, 166, 168, 170, 172, 174. As seen in FIGS. 9-11, pinch valve actuators 160, 162, 164, 166 are mounted on the second housing portion 154 while pinch valve actuator 168 is mounted on the first housing portion 152. The remaining pinch valve actuators 170, 172, 174 are mounted along the interface or seam 176 created between the first housing portion 152 and the second housing portion 154. These pinch valve actuators 170, 172, 174 are generally oriented perpendicular or orthogonal to the pinch valve actuators 160, 162, 164, 166, 168. While eight (8) pinch valve actuators are illustrated in FIGS. 9-11 more or less may be included depending on the particular configuration of the encapsulated valve system 150.

Referring to FIGS. 9 and 10, the first housing portion 152 has a first facing surface 178 that includes a plurality of branch passageways 180 formed as a recess within the first facing surface 178 of the first housing portion 152. In particular, the recesses that form the plurality of branch passageways 180 may be milled, worked, or molded into the first facing surface 178 as previously described herein. In a similar manner, as best seen in FIG. 11, the second housing portion 154 has a second facing surface 182 and includes a plurality of branch passageways 184 formed as a recess within the second facing surface 182 of the second housing portion 154. The recesses formed in the second facing surface 182 may be formed is the same manner with respect to those recesses within the first facing surface 178. In particular, the branch passageways 180, 184 are formed the first and second facing surfaces 178, 182, respectively, in a mirrored fashion such that the corresponding recesses match to form a substantially concentric passageway when the first facing surface 178 is brought into contact (or close proximity) with the second facing surface 182.

Referring now to FIGS. 9-11, the plurality of branch passageways 180, 184 terminate at respective flange fittings 186a, 186b, 188a, 188b, 190a, 190b, 192a, 192b, 194a, 194b, 196a, 196b. Each flange fitting represents one-half of the complete flange fitting. Thus, when the first facing surface 178 and second facing surface 182 are brought together or in close proximity the complete flange fitting is formed. The complete flange fitting (e.g., 186a and 186b) appear circular in shape although other geometries may be utilized. The flange fittings 186a, 186b, 188a, 188b, 190a, 190b, 192a, 192b, 194a, 194b, 196a, 196b may be formed to conform to uniform standards within the relevant industry or application. While it is contemplated that the flange fittings 186a, 186b, 188a, 188b, 190a, 190b, 192a, 192b, 194a, 194b, 196a, 196b may be designed to conform to these standards or commercial conventions other sizes are also contemplated to fall within the scope of the invention. Each flange fitting 186a, 186b, 188a, 188b, 190a, 190b, 192a, 192b, 194a, 194b, 196a, 196b optionally includes a recess 198 (FIG. 9) that is dimensioned to receive seal or gasket similar to that discussed herein with respect to the embodiment of FIGS. 1-3.

Similarly, as an alternative to the flange fittings 186a, 186b, 188a, 188b, 190a, 190b, 192a, 192b, 194a, 194b, 196a, 196b described above, the branch passageways 180, 184 may terminate in plain tube endings or other types of connectors known to those skilled in the art. The connectors may be integrally formed into the first and second housing portions 152, 154 or they may be secured after formation of the first and second housing portions 152, 154. For example, the endings or connectors may be welded, bonded, or otherwise affixed to the first and second housing portions 152, 154. The endings or connectors may be configured to adapt to other mechanical or heat-weldable union types known to those skilled in the art. Optionally, the first and second housing portions 152, 154 may not have any flange fittings, for example, as illustrated in FIG. 8.

Referring to FIG. 9, the first housing portion 152 and the second housing portion 154 may be secured to one another via a fastener 200. The fastener 200 is a screw or bolt that passes through apertures 202 that are located in the first housing portion 152 and the second housing portion 154. The fastener 200 may include other devices such as clamps, bolts or the like. It may even be possible to use an adhesive bond between the first housing portion 152 and the second housing portion 154. The fasteners 200 are configured to be removable such that the first housing portion 152 can be separated from the second housing portion 154 to remove the inner disposable conduit 156.

As best seen in FIGS. 10 and 11, along pre-selected portions of the branch passageways 180, 184 there are provided apertures 206 that are dimensioned to receive a pinching element 208 (seen in FIG. 10) from respective pinch valve actuators 160, 162, 164, 166, 168, 170, 172, 174. The various apertures 206 are associated with a respective actuator as described herein. The locations of the various apertures 206 are chosen to provide the ability to valve or gate a fluid medium into one or more selected branch passageways 180, 184 as previously described.

An advantage of having the pinch valve actuators 170, 172, 174 located along the seam or interface 176 formed between the first housing portion 152 and the second housing portion 154 is that this reduces the overall size or footprint of the encapsulated valve system 150. This is particularly important given that multiple encapsulated valve systems 150 may be used in a particular process or operation. For example, as one alternative aspect, the actuator 168 may even be moved to a lateral position along the seam 176. This would reduce the overall height of the encapsulated valve system. Another advantage of the embodiment of FIGS. 9-11 is that the amount of residual volume of fluid contained in the encapsulated valve system 150 can be reduced.

Figure 12:
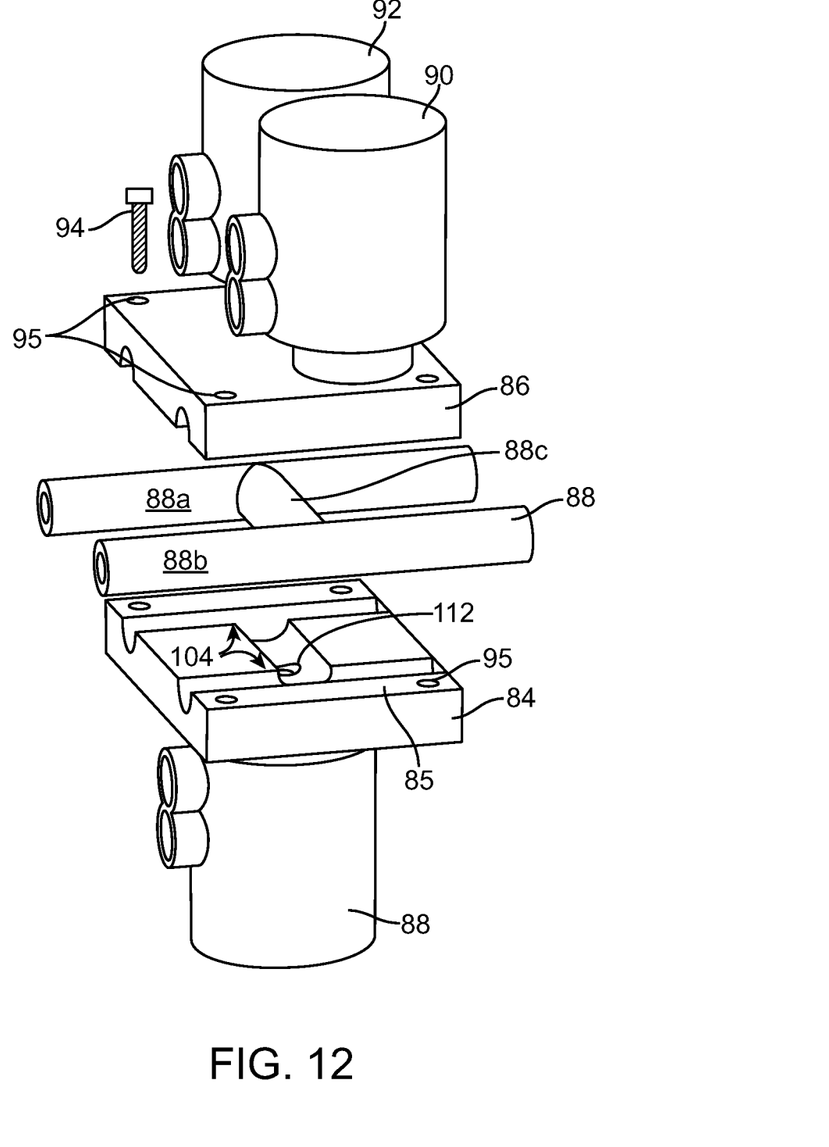
FIG. 12 illustrates an exploded, perspective view of an encapsulated valve system according to another embodiment.

FIG. 12 illustrates an embodiment similar to that illustrated in FIG. 5 with the exception that the second housing portion 86 does not include flange fittings 96a, 96b, 98a, 98b, 100a, 100b, and 102a, 102b. The embodiment illustrated in FIG. 12 also does not include a seal or gasket 89 located at the terminal ends of the disposable conduit 88. Instead, the terminal ends of the disposable conduit 88 merely terminates at a cut end that then can be mating with any number of configurations whether hygienic or non-hygienic known to those skilled in the art.

While FIG. 12 illustrates the pinch valve actuators 88, 90, 92 on opposing sides of the first and second housing portions 84, 86, it should be understood that the pinch valve actuators 88, 90, 92 may be located along a seam like that illustrated in FIGS. 9-11. The same applies to the embodiment of FIG. 5. While embodiments of the present invention have been shown and described, various modifications may be made without departing from the scope of the present invention. The invention, therefore, should not be limited, except to the following claims, and their equivalents.

What is claimed is:
1. An encapsulated valve system for fluids comprising:
a first housing having a first facing surface, the first facing surface comprising a plurality of passageways formed therein;
a second housing having a second facing surface, the second facing surface comprising a plurality of corresponding passageways formed therein that mirror the plurality of passageways formed in the first facing surface, wherein at least one of the passageways comprises a common passageway and terminates in an inlet and an outlet and a plurality of remaining passageways comprise branch passageways branching therefrom;
a disposable conduit comprising a polymer interposed between the first housing and the second housing in the plurality of passageways;
a first pinch valve actuator mounted on the first housing portion and oriented generally perpendicular to the first facing surface and configured to pinch and close the disposable conduit at a location within the common pathway;
a plurality of pinch valve actuators mounted on the second housing portion and oriented generally perpendicular to the second facing surface and configured to pinch and close the disposable conduit at selective, different branch passageways; and
at least one removable fastener configured to hold first housing against the second housing in a facing arrangement to form a seam between the first facing surface and the second facing surface; and
further comprising at least one pinch valve actuator disposed at the seam and configured to actuate along a plane of the seam, the at least one pinch valve actuator disposed generally perpendicular to the first pinch valve actuator and the plurality of pinch valve actuators mounted on the second housing portion.

2. The encapsulated valve system of claim 1, wherein the at least one fastener comprises a clamp.

3. The encapsulated valve system of claim 1, wherein the at least one fastener comprises a screw.

4. The encapsulated valve system of claim 1, wherein the first housing and second housing comprise metal.

5. The encapsulated valve system of claim 1, wherein the first housing and second housing comprise plastic.

6. The encapsulated valve system of claim 1, wherein the first pinch valve actuator mounted on the first housing and the plurality of pinch valve actuators mounted on the second housing comprise manually adjusted pinch valve actuators.

7. The encapsulated valve system of claim 1, wherein the first pinch valve actuator mounted on the first housing and the plurality of pinch valve actuators mounted on the second housing comprise automatically adjusted pinch valve actuators.

8. The encapsulated valve system of claim 1, wherein the first housing and second housing comprise a plurality of connectors disposed at locations wherein the common and branch passageways terminate.

9. The encapsulated valve system of claim 1, wherein the conduit terminates in a sealing member.

10. The encapsulated valve system of claim 1, wherein the conduit comprises un-reinforced tubing.

11. The encapsulated valve system of claim 10, wherein the conduit comprises silicone.

12. An encapsulated valve system for pressurized fluids comprising:
- a first metal housing having a first facing surface, the first facing surface comprising a plurality of branch pathways formed as a recess within the first facing surface, wherein one of the plurality of branch pathways comprises a first aperture;
- a second metal housing having a second facing surface, the second facing surface comprising a plurality of branch pathways formed as a recess within the second facing surface, wherein one of the plurality of branch pathways comprises a second aperture located at a different location from the first aperture;
- a disposable conduit comprising polymer tubing configured to be interposed between the first and second housing portions and disposed within the recess of the first facing surface and the recess of the second facing surface, the disposable conduit configured to carry a pressurized fluid therein; and
- a first automatically-controlled pinch valve actuator mounted on the first housing, a second automatically-controlled pinch valve actuator mounted on the second housing, wherein the first automatically-controlled pinch valve actuator is disposed on the first metal housing and oriented generally perpendicular to the first facing surface and comprises a pinching element configured to pass through the first aperture and wherein the second automatically-controlled pinch valve actuator is disposed on the second metal housing and oriented generally perpendicular to the second facing surface and comprises a pinching element configured to pass through the second aperture, wherein the first and second automatically-controlled pinch valve actuators are configured have an "on" state and an "off" state, wherein in the "off" state the pinching element of does not pass through its respective aperture and wherein in the "on" state, the pinching element passes through its respective aperture and completely closes the disposable conduit to prevent the passage of pressurized fluid therethrough.

13. A method of valving pressurized fluids comprising:
providing an encapsulated valve system for pressurized fluids comprising:
- a first metal housing having a first facing surface, the first facing surface comprising a plurality of branch pathways formed as a recess within the first facing surface, wherein one of the plurality of branch pathways comprises a first aperture;
- a second metal housing having a second facing surface, the second facing surface comprising a plurality of branch pathways formed as a recess within the second facing surface, wherein one of the plurality of branch pathways comprises a second aperture located at a different location from the first aperture;
- a disposable conduit comprising polymer tubing configured to be interposed between the first and second housing portions and disposed within the recess of the first facing surface and the recess of the second facing surface, the disposable conduit configured to carry a pressurized fluid therein;
- a first automatically-controlled pinch valve actuator mounted on the first housing, wherein the first automatically-controlled pinch valve actuator is disposed on the first metal housing and oriented generally perpendicular to the first facing surface and comprises a pinching element configured to pass through the first aperture;
- a second automatically-controlled pinch valve actuator mounted on the second housing, wherein the second automatically-controlled pinch valve actuator is disposed on the second metal housing and oriented generally perpendicular to the second facing surface and comprises a pinching element configured to pass through the second aperture, wherein the first and second automatically-controlled pinch valve actuators are configured have an "on" state and an "off" state, wherein in the "off" state the pinching element of does not pass through its respective aperture and wherein in the "on" state, the pinching element passes through its respective aperture and completely closes the disposable conduit to prevent the passage of pressurized fluid therethrough;
- at least one removable fastener configured to secure the first housing to the second housing;
flowing a pressurized fluid through the disposable conduit and actuating the first and second pinch valve actuators;
opening the first and second housings with the at least one removable fastener;
disposing of the disposable conduit and replacing the same with a second disposable conduit;
closing the opening the first and second housings with the at least one removable fastener; and
flowing a pressurized fluid through the disposable conduit and actuating the first and second pinch valve actuators.

* * * * *